(12) United States Patent
Miller

(10) Patent No.: US 11,266,137 B1
(45) Date of Patent: Mar. 8, 2022

(54) TENSION-ADJUSTING FISHING POLE

(71) Applicant: Benny H. Miller, Taylors, SC (US)

(72) Inventor: Benny H. Miller, Taylors, SC (US)

(*) Notice: Subject to any disclaimer, the term of this patent is extended or adjusted under 35 U.S.C. 154(b) by 152 days.

(21) Appl. No.: 16/781,531

(22) Filed: Feb. 4, 2020

Related U.S. Application Data

(63) Continuation-in-part of application No. 16/674,171, filed on Nov. 5, 2019.

(51) Int. Cl.
| | |
|---|---|
| *A01K 87/00* | (2006.01) |
| *A01K 87/08* | (2006.01) |
| *A01K 87/02* | (2006.01) |
| *A01K 87/06* | (2006.01) |
| *A01K 89/00* | (2006.01) |

(52) U.S. Cl.
CPC .............. *A01K 87/00* (2013.01); *A01K 87/02* (2013.01); *A01K 87/08* (2013.01); *A01K 87/06* (2013.01); *A01K 89/006* (2013.01)

(58) Field of Classification Search
CPC .................................................... A01K 87/00
See application file for complete search history.

(56) References Cited

U.S. PATENT DOCUMENTS

| | | | | |
|---|---|---|---|---|
| 4,458,418 | A * | 7/1984 | McSmith | B26B 15/00 30/228 |
| 4,800,668 | A | 1/1989 | Burrough | |
| 5,195,267 | A * | 3/1993 | Daniels | A01K 87/00 43/18.1 |
| 5,316,300 | A | 5/1994 | Simmons | |
| 5,632,693 | A * | 5/1997 | Painter | A63B 53/08 473/318 |
| 6,361,451 | B1 | 3/2002 | Masters | |
| 7,226,365 | B2 | 6/2007 | Qualizza | |
| 2009/0163288 | A1* | 6/2009 | Qualizza | A63B 53/12 473/318 |

FOREIGN PATENT DOCUMENTS

WO    2000016857    3/2000

\* cited by examiner

*Primary Examiner* — Joshua J Michener
*Assistant Examiner* — Henry Hooper Mudd
(74) *Attorney, Agent, or Firm* — Kyle A. Fletcher, Esq.

(57) ABSTRACT

The tension-adjusting fishing pole may comprise a rod blank, a rod handle, an activation handle, and a reel. The rod handle and the rod blank may couple together to form a fishing pole. The reel may be coupled to a reel seat on the rod handle such that the fishing pole and the reel may be operable to catch fish. The rod blank may comprise a hollow interior. A fluid may be forced into the hollow interior of the rod blank by operating the activation handle and may increase pressure within the rod blank to stiffen the rod blank. The pressure exerted by the fluid within the rod blank may be reduced to allow the rod blank to flex.

16 Claims, 3 Drawing Sheets

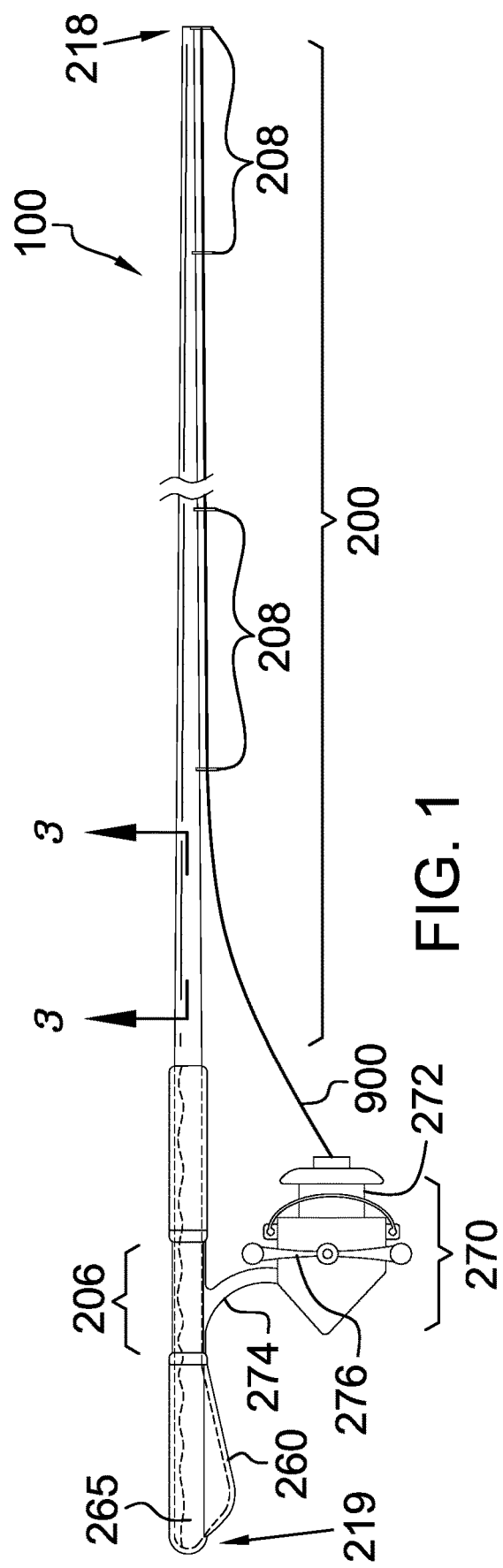
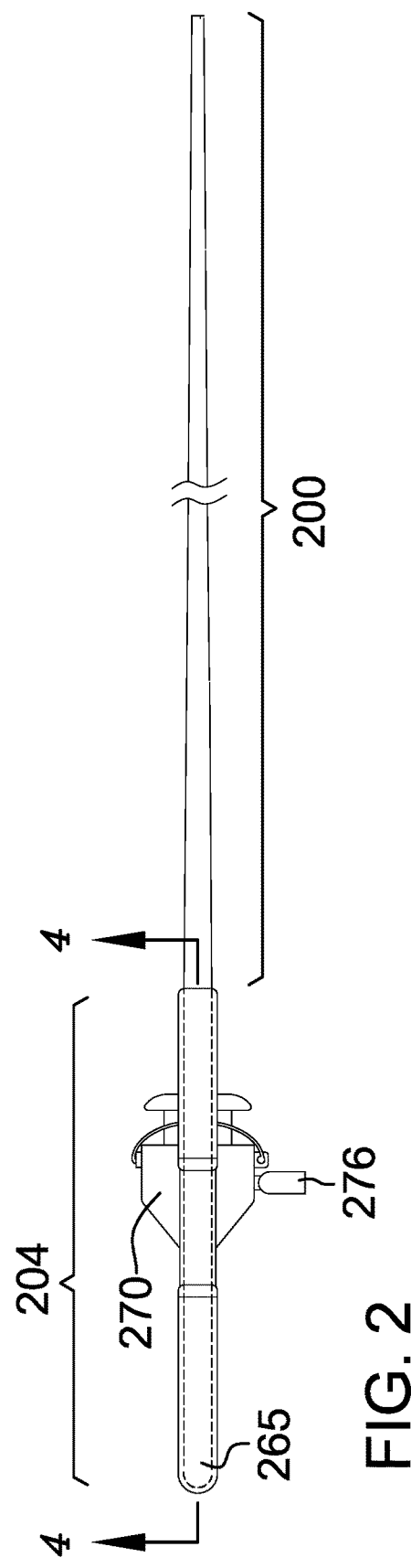

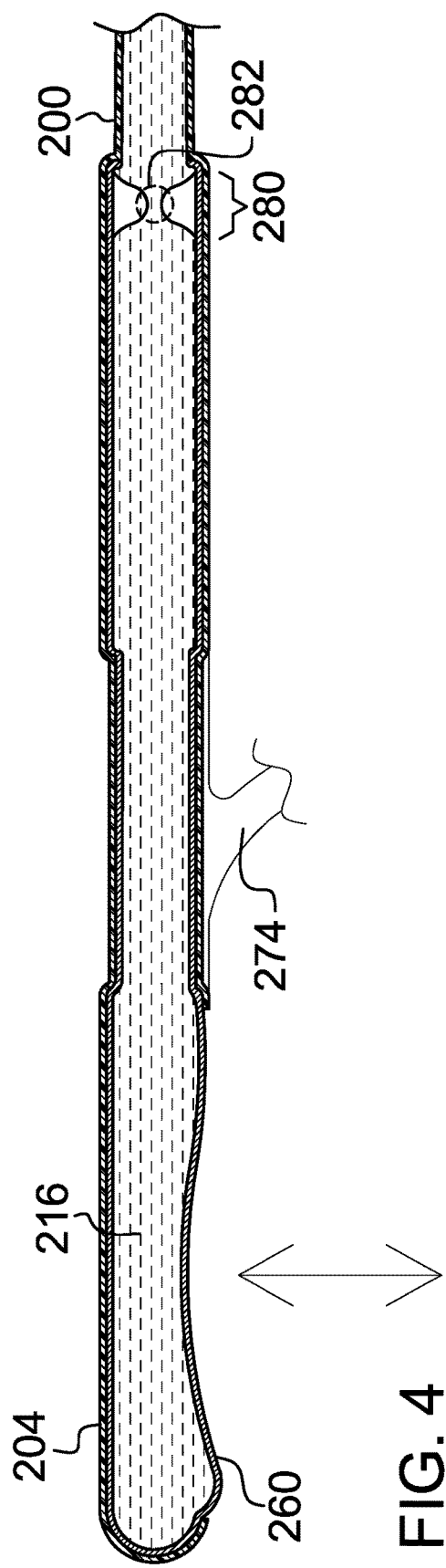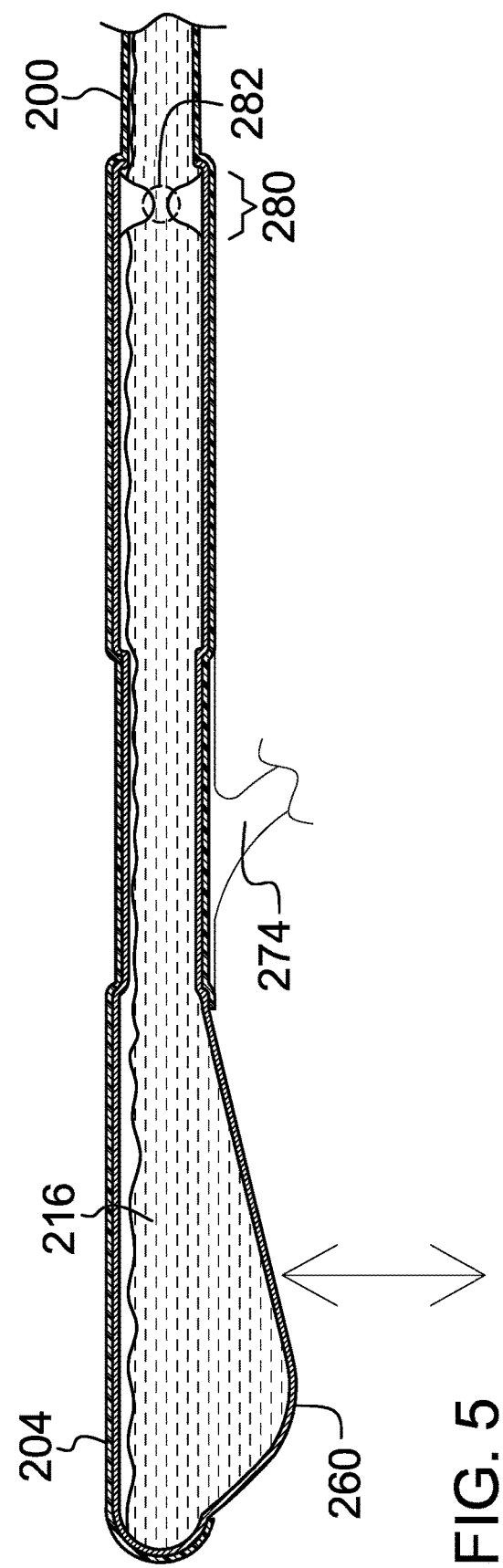

TENSION-ADJUSTING FISHING POLE

CROSS REFERENCES TO RELATED APPLICATIONS

This continuation-in-part application claims priority to U.S. application Ser. No. 16/674,141, filed by the applicant on Nov. 5, 2019.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a tension-adjusting fishing pole.

SUMMARY OF INVENTION

The tension-adjusting fishing pole may comprise a rod blank, a rod handle, an activation handle, and a reel. The rod handle and the rod blank may couple together to form a fishing pole. The reel may be coupled to a reel seat on the rod handle such that the fishing pole and the reel may be operable to catch fish. The rod blank may comprise a hollow interior. A fluid may be forced into the hollow interior of the rod blank by operating the activation handle and may increase pressure within the rod blank to stiffen the rod blank. The pressure exerted by the fluid within the rod blank may be reduced to allow the rod blank to flex.

An object of the invention is to deploy a fishing line from a reel of a fishing pole during a casting operation and retrieve the fishing line by turning a crank on the reel.

Another object of the invention is to vary the stiffness of a rod blank on the fishing pole such that the rod blank is less stiff during casting.

A further object of the invention is to increase the stiffness of the rod blank by squeezing an activation handle such that a fluid within the hollow interior of the rod handle is pressurized and flows into the rod blank.

Yet another object of the invention is to decrease the stiffness of the rod blank releasing the activation handle such that a fluid within the hollow interior is de-pressurized and flows back into the rod handle.

These together with additional objects, features and advantages of the tension-adjusting fishing pole will be readily apparent to those of ordinary skill in the art upon reading the following detailed description of the presently preferred, but nonetheless illustrative, embodiments when taken in conjunction with the accompanying drawings.

In this respect, before explaining the current embodiments of the tension-adjusting fishing pole in detail, it is to be understood that the tension-adjusting fishing pole is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tension-adjusting fishing pole.

It is therefore important that the claims be regarded as including such equivalent construction insofar as they do not depart from the spirit and scope of the tension-adjusting fishing pole. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a side view of an embodiment of the disclosure.
FIG. 2 is a top view of an embodiment of the disclosure.
FIG. 4 is a cross-sectional view of an embodiment of the disclosure across 4-4 as shown in FIG. 2 illustrating the activation handle when squeezed.
FIG. 5 is a cross-sectional view of an embodiment of the disclosure across 4-4 as shown in FIG. 2 illustrating the activation handle when released.

DETAILED DESCRIPTION OF THE EMBODIMENT

Figure 3:
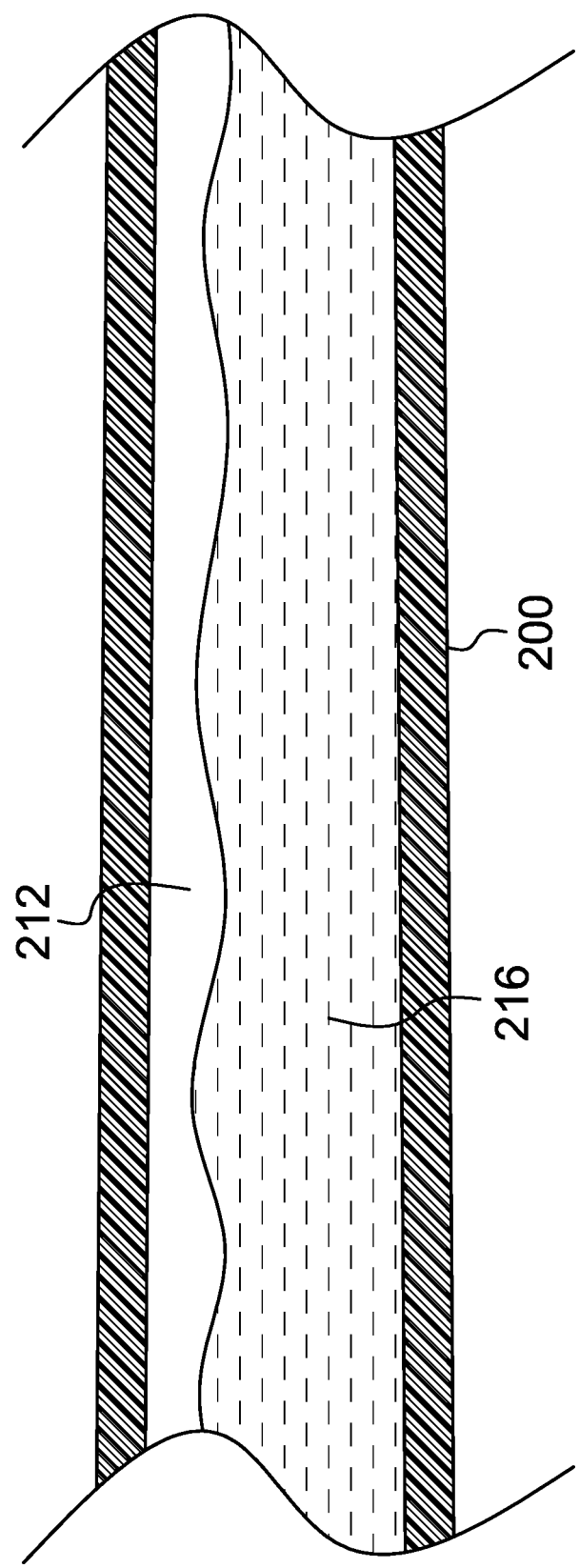
FIG. 3 is a cross-sectional view of an embodiment of the disclosure across 3-3 as shown in FIG. 1.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The tension-adjusting fishing pole 100 (hereinafter invention) comprises a rod blank 200, a rod handle 204, an activation handle 260, and a reel 270. The rod handle 204 and the rod blank 200 may couple together to form a fishing pole. The reel 270 may be coupled to a reel seat 206 on the rod handle 204 such that the fishing pole and the reel 270 may be operable as the fishing pole. The rod blank 200 may comprise a hollow interior 212. A fluid 216 may be forced into the hollow interior 212 of the rod blank 200 by the activation handle 260 and may increase pressure within the rod blank 200 to stiffen the rod blank 200. The pressure exerted by the fluid 216 within the rod blank 200 may be reduced to allow the rod blank 200 to flex.

The rod blank 200 may be a cylindrical, tapered support for a fishing line 900. During casting, the rod blank 200 may bend and may act as a catapult to launch a lure, a hook, bait, or combinations thereof. A proximal end 219 of the rod blank 200 may be coupled to a distal end 218 of the rod handle 204. The rod blank 200 may comprise a plurality of guides 208 that are disposed linearly along the length of the rod blank 200 on the same side of the rod blank 200 as the reel 270. The plurality of guides 208 may guide the fishing line 900 along the rod blank 200.

The rod handle 204 may be adapted for a hand of a user to hold the invention 100 while fishing. The distal end 218 of the rod handle 204 may couple to the proximal end 219 of the rod blank 200. The rod handle 204 may be hollow.

A reservoir 265 may be a liner for the interior of the rod handle 204. The interior of the reservoir 265 may couple to the interior of the rod blank 200 when the rod blank 200 is coupled to the rod handle 204 such that the fluid 216 may flow between the reservoir 265 and the rod blank 200. The fluid 216 may be moved from the reservoir 265 located within the rod handle 204 into the hollow interior 212 of the rod blank 200 to stiffen the rod blank 200. The fluid 216 may be moved from the rod blank 200 into the reservoir 265 of the rod handle 204 to relax the rod blank 200. The rod handle 204 may comprise the reel seat 206. The reel seat 206 may be a mounting point for the reel 270. A reel foot 274 of the reel 270 may be coupled to the rod handle 204 via the reel seat 206.

The activation handle 260 may be a semi-rigid extension of the reservoir 265. The activation handle 260 may extend outside of the rod handle 204. The activation handle 260 may be adapted to be squeezed by the user. The activation handle 260 may compress the reservoir 265 into a smaller volume when squeezed and may increase the pressure within the reservoir 265 such that the fluid 216 is forced out of the reservoir 265 into the rod blank 200. The original shape of the activation handle 260 may be restored when the grip on the activation handle 260 is relaxed. As the volume of the reservoir 265 increases, the pressure with the reservoir 265 may drop such that the fluid 216 may be suctioned back into the reservoir 265 from the rod blank 200.

The distal end of the rod handle 204 may comprise a converging-diverging nozzle 280. The converging-diverging nozzle 280 may be a narrowing of the interior of the rod handle 204. The converging-diverging nozzle 280 may allow the fluid 216 to pass through a pinch gap 282 while supporting disparate pressures on either side of the pinch gap 282. Specifically, the converging-diverging nozzle 280 may cause a partial vacuum to form within the rod handle 204 when the activation handle 260 is released. The partial vacuum may result in the pressure within the rod handle 204 being lower than the pressure within the rod blank 200 and may cause the fluid 216 to flow through the converging-diverging nozzle 280 from the rod blank 200 into the rod handle 204.

The reel 270 may comprise a spool 272, the reel foot 274, and a reel handle 276. The reel 270 may be operable to feed the fishing line 900 out of the reel 270 during casting and to retrieve the fishing line 900 when the reel handle 276 is cranked. The fishing line 900 may be wound around the spool 272. The reel 270 may allow the fishing line 900 to deploy from the spool 272 during casting. The spool 272 may rotate as the reel handle 276 is cranked such that the fishing line 900 is pulled into the reel 270 and wound around the spool 272.

In use, the activation handle 260 may be released to reduce the pressure within the rod blank 200, making the rod blank 200 for flexible for casting. When a fish bites the lure or the bait, the activation handle 260 may be squeezed to force the fluid 216 from the rod handle 204 into the rod blank 200, thus stiffening the rod blank 200. After setting the hook, the activation handle 260 may be released to draw the fluid 216 back into the rod handle 204 from the rod blank 200.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

In this disclosure, "compress" may refer to forcing into a smaller space.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "fishing line" may refer to a monofilament cord to which a hook or lure is attached for the purpose of capturing a fish.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "grip" may refer to a covering that is placed over a hand hold, handle, shaft, or other object.

As used herein, "handle" may refer to an object by which a tool, object, or door is held or manipulated with the hand.

As used in this disclosure, the word "interior" is used as a relational term that implies that an object is located or contained within the boundary of a structure or a space.

As used herein, "reservoir" may refer to a container or containment system that is configured to store a liquid, gas, or gel.

As used herein, "resilient" or "semi-rigid" may refer to an object or material which will deform when a force is applied to it and which will return to its original shape when the deforming force is removed.

As used herein, "spool" may refer to a cylindrical device upon which a flexible material, including but not limited to a rope, a cable, a yarn, a cord, a sheet of fabric, or a tape, can be wound. Depending on context, a spool may also comprise the flexible material stored upon the spool.

As used herein, "stiffen" may refer to an increase in the rigidity of an object. Specifically, if it now takes more force to achieve the same amount of deformation of an object that previously required a lesser amount of force to achieve, then the object is said to have stiffened.

As used herein, "taper" may refer to a continuous and typically, but not necessarily, gradual change in the span of a one or more dimensions of an elongated object that occurs in the apparent direction of elongation. An object that narrows along an axis may be called tapered.

As used herein, "vacuum" may refer to a first space that contains gas at a reduced gas pressure relative to the gas pressure of a second space. If the first space and the second space are connected together, this pressure differential will cause gas from the second space to move towards the first space until the pressure differential is eliminated.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tension-adjusting fishing pole comprising:
   a rod blank, a rod handle, an activation handle, and a reel;
   wherein the rod handle and the rod blank couple together to form a fishing pole;
   wherein the reel is coupled to a reel seat on the rod handle such that the fishing pole and the reel are operable as the fishing pole;
   wherein the rod blank is a cylindrical, tapered support for a fishing line;
   wherein a proximal end of the rod blank is coupled to a distal end of the rod handle;
   wherein the distal end of the rod handle comprises a converging-diverging nozzle;
   wherein the converging-diverging nozzle is a narrowing of the interior of the rod handle;
   wherein the converging-diverging nozzle allows the fluid to pass through a pinch gap while supporting disparate pressures on either side of the pinch gap.

2. The tension-adjusting fishing pole according to claim 1 wherein the rod blank comprises a hollow interior;
   wherein a fluid is forced into the hollow interior of the rod blank by the activation handle and increases pressure within the rod blank to stiffen the rod blank;
   wherein the pressure exerted by the fluid within the rod blank is reduced to allow the rod blank to flex.

3. The tension-adjusting fishing pole according to claim 2 wherein the rod blank comprises a plurality of guides that are disposed linearly along the length of the rod blank on the same side of the rod blank as the reel;
   wherein the plurality of guides guide the fishing line along the rod blank.

4. The tension-adjusting fishing pole according to claim 3 wherein the rod handle is adapted for a hand of a user to hold the tension-adjusting fishing pole while fishing.

5. The tension-adjusting fishing pole according to claim 4 wherein the distal end of the rod handle couples to the proximal end of the rod blank;
   wherein the rod handle is hollow.

6. The tension-adjusting fishing pole according to claim 5 wherein a reservoir is a liner for the interior of the rod handle;
   wherein the interior of the reservoir couples to the interior of the rod blank when the rod blank is coupled to the rod handle such that the fluid flows between the reservoir and the rod blank.

7. The tension-adjusting fishing pole according to claim 6 wherein the fluid is moved from the reservoir located within the rod handle into the hollow interior of the rod blank to stiffen the rod blank.

8. The tension-adjusting fishing pole according to claim 7 wherein the fluid is moved from the rod blank into the reservoir of the rod handle to relax the rod blank.

9. The tension-adjusting fishing pole according to claim 8 wherein the rod handle comprises the reel seat;
   wherein the reel seat is a mounting point for the reel;
   wherein a reel foot of the reel is coupled to the rod handle via the reel seat.

10. The tension-adjusting fishing pole according to claim 9 wherein the activation handle is a semi-rigid extension of the reservoir.

11. The tension-adjusting fishing pole according to claim 10 wherein the activation handle extends outside of the rod handle.

12. The tension-adjusting fishing pole according to claim 11 wherein the activation handle is adapted to be squeezed by the user;
   wherein the activation handle compresses the reservoir into a smaller volume when squeezed and increases the pressure within the reservoir such that the fluid is forced out of the reservoir into the rod blank.

13. The tension-adjusting fishing pole according to claim 12 wherein the original shape of the activation handle is restored when the grip on the activation handle is relaxed;
   wherein as the volume of the reservoir increases, the pressure with the reservoir drops such that the fluid is suctioned back into the reservoir from the rod blank.

14. The tension-adjusting fishing pole according to claim 13 wherein the converging-diverging nozzle causes a partial vacuum to form within the rod handle when the activation handle is released.

15. The tension-adjusting fishing pole according to claim 14 wherein the partial vacuum results in the pressure within the rod handle being lower than the pressure within the rod blank and causes the fluid to flow through the converging-diverging nozzle from the rod blank into the rod handle.

16. The tension-adjusting fishing pole according to claim 15 wherein the reel comprises a spool, the reel foot, and a reel handle;

wherein the reel is operable to feed the fishing line out of the reel during casting and to retrieve the fishing line when the reel handle is cranked;

wherein the fishing line is wound around the spool;

wherein the reel allows the fishing line to deploy from the spool during casting;

wherein the spool rotates as the reel handle is cranked such that the fishing line is pulled into the reel and wound around the spool.

\* \* \* \* \*